(12) United States Patent
Krishnadoss et al.

(10) Patent No.: US 11,698,988 B2
(45) Date of Patent: Jul. 11, 2023

(54) LIGHT WEIGHT TRANSPORT STREAM STREAMING PROTOCOL FOR LIVE TRANSCODING SYSTEM

(71) Applicant: SLING MEDIA PVT LTD, Bangaluru (IN)

(72) Inventors: Senthilkumar Krishnadoss, Saram (IN); Rakesh Eluvan Periyaeluvan, Bangalore (IN); Jayaprakash Narayanan Ramaraj, Bangalore (IN); Girish V. Reddivari, Bangalore (IN); Chitra Siddalinga Murthy, Bangalore (IN)

(73) Assignee: DISH Network Technologies India Private Limited (IN)

( * ) Notice: Subject to any disclaimer, the term of this patent is extended or adjusted under 35 U.S.C. 154(b) by 33 days.

(21) Appl. No.: 16/565,310

(22) Filed: Sep. 9, 2019

(65) Prior Publication Data
US 2020/0084509 A1    Mar. 12, 2020

(30) Foreign Application Priority Data
Sep. 7, 2018    (IN) .............................. 201841033714

(51) Int. Cl.
*H04N 21/60* (2011.01)
*G06F 21/62* (2013.01)
(Continued)

(52) U.S. Cl.
CPC .......... *G06F 21/6227* (2013.01); *G06F 3/067* (2013.01); *G06F 3/0622* (2013.01); *G06F 3/0637* (2013.01); *G06F 13/4282* (2013.01);
*G06F 16/1815* (2019.01); *G06F 21/44* (2013.01); *G06F 21/602* (2013.01); *H04L 9/065* (2013.01); *H04L 9/0631* (2013.01); *H04L 9/0637* (2013.01); *H04L 9/0643* (2013.01); *H04L 63/0457* (2013.01); *H04L 63/0876* (2013.01); *H04N 5/7755* (2013.01); *H04N 5/913* (2013.01); *H04N 21/2187* (2013.01); *H04N 21/4147* (2013.01); *H04N 21/434* (2013.01); *H04N 21/4334* (2013.01); *H04N 21/4408* (2013.01); *H04N 21/440218* (2013.01); *H04N 21/4532* (2013.01);
(Continued)

(58) Field of Classification Search
CPC ........................... H04N 21/234; H04N 21/235
See application file for complete search history.

(56) References Cited

U.S. PATENT DOCUMENTS 7,165,175 B1 *  1/2007  Kollmyer ........... H04N 21/8193
                                                                  713/154
7,467,297 B2 * 12/2008  Ji ........................ H04N 21/835
                                                                  375/E7.009
(Continued)

*Primary Examiner* — Mushfikh I Alam
(74) *Attorney, Agent, or Firm* — KW Law, LLP (57) ABSTRACT

A robust, computationally-efficient and secure system is described for streaming content from a server to a client device via the Internet or another digital network. Various aspects relate to automated processes, systems and devices for securing a media stream with efficient yet effective digital cryptography. In particular, content may be transmitted in transport stream (TS) format in which all packets are
(Continued)

encrypted (e.g., using a cipher block chain), in which control packets are exempted from encryption (e.g., using an electronic codebook), or in any other manner.

11 Claims, 4 Drawing Sheets

(51) Int. Cl.

| | | |
|---|---|---|
| *G06F 16/18* | (2019.01) | |
| *G06F 13/42* | (2006.01) | |
| *G06F 21/60* | (2013.01) | |
| *H04L 9/06* | (2006.01) | |
| *H04N 5/775* | (2006.01) | |
| *H04N 5/913* | (2006.01) | |
| *G06F 3/06* | (2006.01) | |
| *G06F 21/44* | (2013.01) | |
| *H04L 9/40* | (2022.01) | |
| *H04N 21/2187* | (2011.01) | |
| *H04N 21/4147* | (2011.01) | |
| *H04N 21/433* | (2011.01) | |
| *H04N 21/434* | (2011.01) | |
| *H04N 21/4402* | (2011.01) | |
| *H04N 21/4408* | (2011.01) | |
| *H04N 21/45* | (2011.01) | |

(52) U.S. Cl.
CPC .............. *G06F 2213/0042* (2013.01); *G06F 2221/2107* (2013.01); *H04N 2005/91342* (2013.01)

(56) References Cited

U.S. PATENT DOCUMENTS

| | | | | |
|---|---|---|---|---|
| 7,706,531 | B2* | 4/2010 | Yoshida | G11B 20/12 |
| | | | | 713/193 |
| 8,385,544 | B2* | 2/2013 | Kobayashi | H04N 21/23476 |
| | | | | 380/201 |
| 10,182,269 | B1* | 1/2019 | Samant | H04N 21/2353 |
| 2005/0069130 | A1* | 3/2005 | Kobayashi | H04L 63/0471 |
| | | | | 375/E7.009 |
| 2007/0104097 | A1* | 5/2007 | Rassool | H04N 21/6125 |
| | | | | 370/229 |
| 2007/0265978 | A1* | 11/2007 | Kahn | G06F 21/10 |
| | | | | 705/59 |
| 2009/0228639 | A1 | 9/2009 | Cho | |
| 2011/0107378 | A1 | 5/2011 | Kooman | |
| 2012/0166524 | A1 | 6/2012 | Watakabe et al. | |
| 2012/0246462 | A1* | 9/2012 | Moroney | H04L 63/10 |
| | | | | 713/151 |
| 2013/0019109 | A1 | 1/2013 | Kang et al. | |
| 2013/0202109 | A1* | 8/2013 | Ducharme | H04N 21/23476 |
| | | | | 380/200 |
| 2014/0044258 | A1* | 2/2014 | Grewal | H04N 21/266 |
| | | | | 380/200 |
| 2014/0108668 | A1* | 4/2014 | Zhang | H04L 67/02 |
| | | | | 709/228 |
| 2014/0297953 | A1 | 10/2014 | Beck et al. | |
| 2014/0380352 | A1* | 12/2014 | Mangalore | H04N 21/8456 |
| | | | | 725/31 |
| 2017/0353516 | A1* | 12/2017 | Gordon | H04L 67/10 |
| 2019/0007462 | A1* | 1/2019 | Govindarajan | H04N 21/2662 |
| 2019/0014145 | A1* | 1/2019 | Levine | H04L 63/126 |
| 2021/0076086 | A1* | 3/2021 | Olechowski | H04N 21/2402 |

* cited by examiner

LIGHT WEIGHT TRANSPORT STREAM STREAMING PROTOCOL FOR LIVE TRANSCODING SYSTEM

PRIORITY CLAIM

This application claims priority to India Provisional Patent Application Number 201841033714 filed on Sep. 7, 2018, which is incorporated herein by reference.

TECHNICAL FIELD

The following discussion generally relates to security of digital data. More particularly, the following discussion relates to securing data that is stored on a solid state or magnetic medium and/or that is transmitted over a network to a client device. Various embodiments may be used in connection with time and/or place shifting devices such as media players or digital video recorder (DVR) devices that store digital video content and/or provide video streams of stored content for remote "place shifted" viewing.

BACKGROUND

Viewers now obtain television and other media content from a wide array of devices and sources. Media streaming is increasingly replacing broadcast television, for example, and time and place shifting devices are becoming increasingly common in homes, offices and other settings. The digital video recorder (DVR), for example, allows television viewers to record television programming or other content for viewing at a later time. Place shifting devices allow live and/or pre-recorded programs to be encoded for efficient delivery over local and/or wide area networks for viewing on a phone, tablet, computer or other device at a remote location from the place that the content is received or stored.

Although time shifting, place shifting and media streaming devices can provide highly-convenient content delivery for viewers, it is a continual challenge to prevent unauthorized duplication or distribution of digital media content through misuse of the storage or streaming mechanisms. A wide array of digital rights management (DRM) services, cryptographic techniques and access control schemes have been attempted in the past, but these typically exhibit issues with compatibility, computational demands, processing delay, and/or other issues, particularly when implemented using consumer-type encoding and storage hardware commonly found in homes, offices and other consumer premises.

It is therefore desirable to create devices, systems and processes to effectively yet efficiently protect digital data that is stored on a digital video recorder or similar storage device, and that prevent unauthorized use of streaming or stored data. Other desirable features and characteristics will become apparent from the subsequent detailed description and the appended claims, taken in conjunction with the accompanying drawings and this background section.

BRIEF DESCRIPTION

In various embodiments, a robust, computationally-efficient and secure system is described for streaming content from a server to a client device via the Internet or another digital network. Various aspects relate to automated processes, systems and devices for securing a media stream with efficient yet effective digital cryptography. In particular, content may be transmitted in transport stream (TS) format in which all packets are encrypted (e.g., using a cipher block chain), in which control packets are exempted from encryption (e.g., using an electronic codebook), or in any other manner.

Various embodiments relate to different automated processes, computing systems, devices and other aspects of a data protection system that maintains security of program content or other data stored by a consumer-type device while preserving convenient access by authorized users of the data. Three aspects of the security system could variously include, without limitation, automated processes, systems and devices: (1) for pairing a storage drive to a host device using a device identifier/user account combination; (2) for protecting stored content with efficient file system encryption; and/or (3) for securing a media stream with efficient yet effective digital cryptography. As noted above, each of these aspects may be implemented separate from each other, and/or any two or more of these concepts may be combined with each other and/or with different aspects for improved security, as desired. Each of these concepts is described in increasing detail below. The following descriptions should be considered as illustrative examples that may be modified and/or enhanced in any number of equivalent practical implementations.

One example embodiment relates to an automated process performed by a host device that transmits a media stream to a remotely-located media player device via a digital network. The host device suitably comprises a processor, a memory, a storage interface configured to physically and electrically couple to a user-provided storage device and a network interface to the digital network. The automated process suitably comprises: receiving digital media content by the host device; storing the received digital media content on the user-provided storage device in a transport stream format; subsequently receiving a request for the media stream from the remotely-located media player device; and in response to the received request, the host device formatting the media stream and transmitting the media stream to the remotely-located client device via the digital network, wherein the formatting comprises encrypting at least a portion of the media stream, and wherein the media stream is transmitted to the remotely-located media player device packets formatted in the transport stream format.

Another embodiment relates to a digital video recorder, media encoder and/or other host device that stores media content on a user-supplied storage device. The host device suitably comprises a storage interface to physically and electrically couple with the user-supplied storage device; a network interface to a digital network; a memory configured to store computer-executable instructions; and a processor configured to execute the computer-executable instructions to perform an automated process. The automated process suitably comprises: receiving digital media content by the host device; storing the received digital media content on the user-provided storage device in a transport stream format; subsequently receiving a request for the media stream from the remotely-located media player device; and in response to the received request, the host device formatting the media stream and transmitting the media stream to the remotely-located client device via the digital network, wherein the formatting comprises encrypting at least a portion of the media stream, and wherein the media stream is transmitted to the remotely-located media player device packets formatted in the transport stream format.

In some embodiments, only data packets (but not control packets) are encrypted using, for example, a cipher block chain (CBC) routine to permit faster processing of control packets. In other embodiments, essentially all of the packets (including both control and data packets) are encoded with electronic codebook (ECB) or similar encryption that is less dependent upon prior data, and therefore faster to decode. Still other embodiments may use other techniques, as desired.

Still other embodiments relate to other devices, systems and automated processes. Examples of these embodiments are provided in increasing detail below.

BRIEF DESCRIPTION OF DRAWING FIGURES

Example embodiments will hereinafter be described in conjunction with the following drawing figures, wherein like numerals denote like elements, and.

DETAILED DESCRIPTION

The following detailed description is intended to provide several examples that will illustrate the broader concepts that are set forth herein, but it is not intended to limit the invention or the application and uses of the invention. Furthermore, there is no intention to be bound by any theory presented in the preceding background or the following detailed description.

In various embodiments, a robust, computationally-efficient and secure system is described for streaming content from a server to a client device via the Internet or another digital network. Various aspects therefore relate to automated processes, systems and devices for securing a media stream with efficient yet effective digital cryptography. In particular, content may be transmitted in transport stream (TS) format in which all packets are encrypted (e.g., using a cipher block chain), in which control packets are exempted from encryption (e.g., using an electronic codebook), or in any other manner.

Various embodiments further relate to different automated processes, computing systems, devices and other aspects of a data protection system that maintains security of program content or other data stored by a consumer-type device while preserving convenient access by authorized users of the data. Various embodiments are particularly useful in the context of a video encoder, digital video recorder or other host device that accepts user-provided storage devices (e.g., USB hard drives, thumb drives and/or the like) for storing media content. Three aspects of the security system could variously include, without limitation, automated processes, systems and devices: (1) for pairing a storage drive with a device identifier/user account combination; (2) for protecting stored content with efficient file system encryption; and/or (3) for securing a media stream with efficient yet effective digital cryptography. As noted above, each of these aspects may be implemented separate from each other, and/or any two or more of these concepts may be combined with each other and/or with different aspects for improved security, as desired. Each of these concepts is described in increasing detail below; the following descriptions should be considered as illustrative examples that may be modified and/or enhanced in any number of equivalent practical implementations.

Various embodiments improve the security of media programming that is stored on a user-provided drive that is paired with a consumer device, such as a media receiver/encoder device that provides time and/or place shifting of stored media content. In an example embodiment, data processed by a time and place shifting device having a processor, memory and input/output interfaces (e.g., a network interface) is secured for storage and transmission as a media stream via a LAN or WAN (e.g., the Internet). U.S. Pat. No. 7,795,062 provides additional detail about several techniques and devices that can be used in for place shifting a media stream, although equivalent embodiments could use any other streaming devices and/or techniques.

Figure 1:
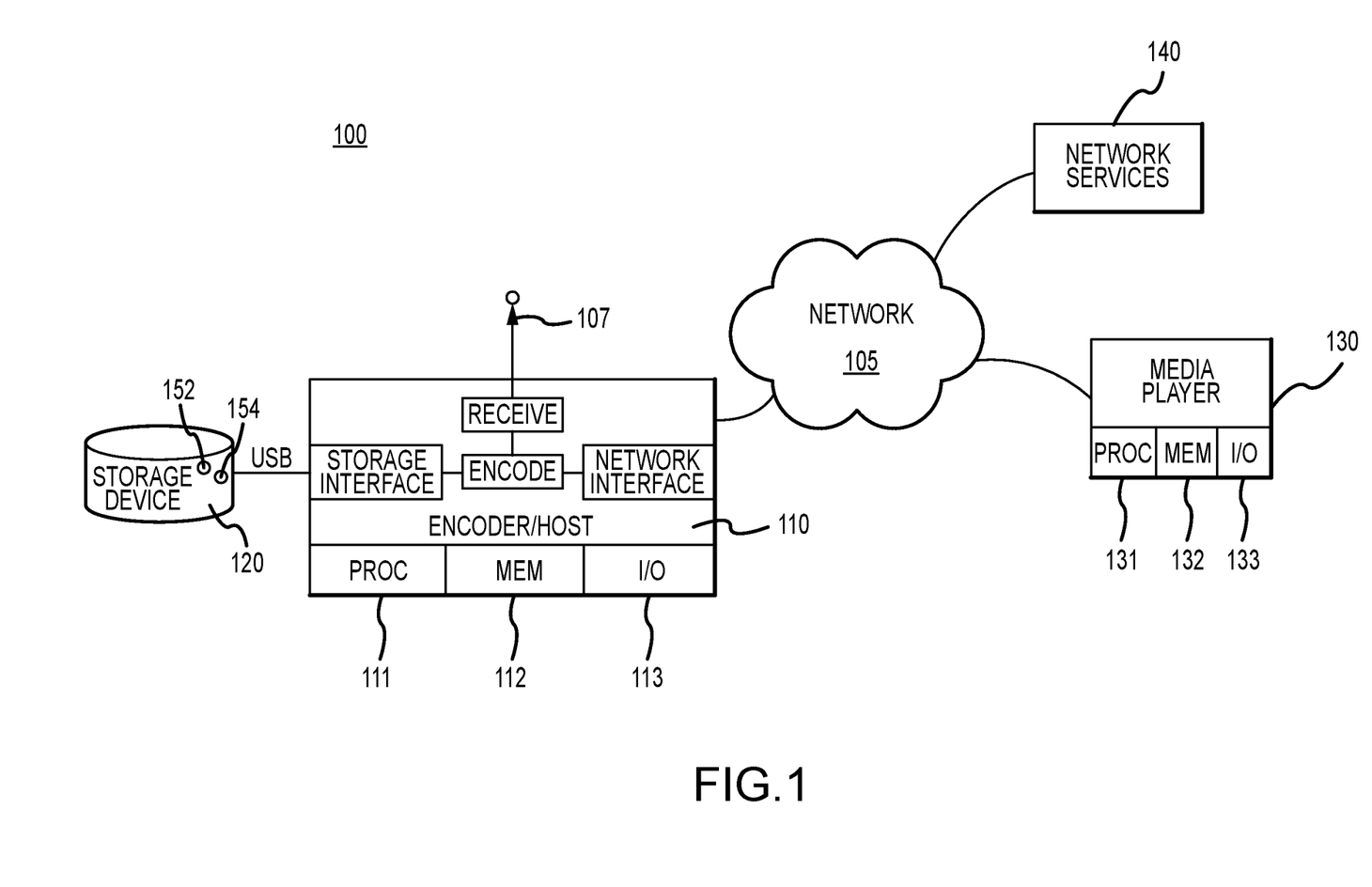
FIG. 1 illustrates one example of a media streaming system in which an encoder device provides media programs to a playback device via a media stream transmitted via a network.

In the example of FIG. 1, an encoder or similar host device 110 interfaces with a user-provided storage device 120 for storing digital media content that is received by host device 110. Host device 110 suitably includes a processor 111, memory 112 and input/output interfaces 113 to receive, store, encode and transmit media content. One example of such a device 110 could be the AirTV Classic device that is available from Sling TV L.L.C. of Englewood, Colo., although equivalent embodiments could be used with any number of other DVRs, media receivers/players, set top boxes, video game consoles, time or place shifting devices and/or the like. The AirTV device responds to user instructions to receive broadcast digital television signals via an antenna 107, to store selected media programs in the attached storage 120, to transcode received and/or stored content for transmission on a local area and/or wide area network, and to transmit the transcoded media streams to user playback devices 130 as media streams for viewing of the programs, as desired. Equivalent embodiments of device 110 could process streaming content received via network 105 (e.g., video on demand (VOD) content, internet television (IPTV), content from a remote storage digital video recorder (RSDVR) and/or the like). Still other equivalent embodiments could process content received via direct broadcast satellite (DBS), via coaxial or other cable delivery, and/or in any other manner. Although not shown in FIG. 1, equivalent embodiments of host device 110 could render the received media content as a direct output to a television or other display, much like a set top box (STB) or similar device, if desired. Direct video output may be provided in addition to and/or in place of place shifted streaming output, as appropriate to the particular embodiment.

Storage device 120 is any magnetic, optical, solid-state or other storage capable of storing media content processed by device 110. In various embodiments, storage device 120 is coupled to the host device 110 via a universal serial bus (USB) or similar standard connection, although any conventional or proprietary connection could be equivalently used. Further embodiments could implement storage device 120 as a "cloud" type storage device that abstracts or otherwise represents digital storage that is accessible to device 110 via network 105, as desired. In the example of FIG. 1, storage device 120 is a conventional magnetic, optical or solid-state memory drive that electrically and communicatively interfaces with device 110 via a USB, Lightning, IEEE 1394 or other relatively standard interface. This allows the user to supply an appropriate drive 120 for his or her personal use that is economical and that provides desired capacity for that user's anticipated storage needs, as desired. User supplied drives also allow for convenient replacement of the drive 120 due to malfunction, obsolescence, a desire for increased capacity, or for any other reason. Conversely, if the user desires to replace the host device 110 for any reason, the user's stored content on drive 120 can be conveniently preserved by simply removing the drive 120 from the older device 110 and plugging the drive 120 into a new host device 110. The replaceable design also allows the drive 120 to be readily removed from the host device 110 to support user travel and/or other purposes.

In the example of FIG. 1, media content that is stored on storage 120 is appropriately retrieved and transcoded by encoder device 120 for transmission to a player device 130 as a place shifted media stream via network 105. Player device 130 is any device that includes a processor 131, memory 132, input/output interfaces 133 and/or other computing hardware to receive and render streaming media content to a user. Player device 130 typically includes additional input functionality to receive user inputs (e.g., via a touchscreen, remote control, keyboard/mouse and/or the like) to select content for viewing and to control the playback of the received media stream. In some implementations, player device 130 interacts with host device 110 through direct communication over a local area and/or wide area network. Equivalent embodiments, however, may route communications through an intermediating network service 140 that is accessible via network 105 or the like.

In various embodiments, playback devices 130 are implemented with any number of different client platforms, such as mobile phones, tablet computers, personal computers, "smart" televisions, set top boxes, video game players, media streaming client devices and/or the like. Many users will want to view their subscribed content and any content received via device 110 using any number of different devices. A user may wish to watch programs using a client application executing on a "smart" television or media streaming device when he or she is at home, for example. That same user may wish to also watch programs on a personal computer at work, and/or on a phone or tablet while away from a larger screen. The availability and extent of simultaneous connections may be controlled through interaction between player device 130, host device 110 and/or network service 140, as desired. As noted above, however, time and place shifting of media content allows users to enjoy streaming content at a variety of times and places, using any number of different client applications each executing on different types of hardware.

Network service 140 is typically a supplier-provided host that provides user authentication, authorization, billing or fee payment verification, electronic program guide and/or other services as needed. Network service 140 may alternately or additionally provide streaming media content directly to player device 130, as desired. Various embodiments could, for example, deliver terrestrial broadcast content received via antenna 107 to player device 130 via host device 110, while non-broadcast content (e.g., "cable TV channels") are delivered directly to player device 130 from a network service 140. In some implementations, network service 140 could additionally provide an integrated electronic programming guide (EPG) that presents programs available from streaming sources (e.g., service 140) and from host device 110 in a common interface. Logic executing within player device 130 and/or network service 140 would be able to discern whether channels or programs selected by the user are available from service 140, from a live broadcast received by host device 110, from content stored in storage 120, and/or from any other source as appropriate. Other embodiments could operate in any other manner to receive and process content from any number of different sources.

FIG. 1 shows network 105 as interconnecting host device 110, player device 130 and network service 140. To that end, network 105 is any sort of public, private or hybrid network capable of supporting digital communication between different entities as described herein. Depending on the embodiment, network 105 may incorporate one or more wired and/or wireless local area networks (LANs) in a home, office or other premises. Network 105 may also incorporate one or more wide area networks (WANs) such as the Internet, private telephone networks, corporate networks and/or other data communications networks as appropriate. The various techniques, devices and systems described herein may be further configured to operate with any additional or alternate links, such as any sort of satellite links, serial connections, point-to-point wireless links (e.g., IEEE 802.15 links), and/or any other wired or wireless data connections, as desired.

System 100 illustrated in FIG. 1 allows users to flexibly provide their own storage device 120 within a host device 110 for storing content that is later viewed using any number of different client devices 130 under the control of network services 140.

Although FIG. 1 shows one host device 110, one storage device 120, one client device 130 and one network service 140 for simplicity, practical embodiments will generally make use of multiple devices within system 100. A typical user will typically access each host device 110 from multiple client devices 130, for example. Users may also have multiple encoder devices 110 (e.g., multiple devices within a home, or in different homes, or in different locations) and/or multiple storage devices 120 in some embodiments. Still further, network services 140 may provide various services (account management, authentication, authorization, EPG delivery, content delivery, etc.) from any number of different sources and computer servers.

As noted above, different embodiments may use one or more security features described herein to provide a high level of flexibility and convenience to the users while maintaining the integrity of media content stored on the user-provided storage devices 120. Several example techniques and structures are described below; the various techniques and structures may be inter-combined with each other in any manner across a wide array of alternate but equivalent embodiments.

Security of Paired Storage Drives

As noted above, allowing users to connect their own storage devices 120 to host device 110 can provide numerous benefits, including convenient selection of storage capacity to match the budget and expected needs of each user, as well as flexibility in upgrading hardware, carrying stored content for travel, preserving stored content even after hardware or software faults, and/or other purposes as desired. It is generally desirable, for example, to allow authorized users to access content stored on their own storage device 120 from other encoder devices 110. Users may have multiple encoder devices 110 operating within their home or office premises, for example, or may have multiple devices in different locations (e.g., different homes, home and office, etc.) and it is generally desirable to allow sharing of content between approved devices 110. It may also be desirable to allow an approved viewer to move the storage device 120 to a new encoder 110 to support hardware upgrades, replacement of defective or outdated hardware, and/or the like. Further, it is generally desirable to allow any user having legitimate access to a host device 110 to access the content stored on a legitimately-paired storage device 120. If an encoder 110 is registered to a particular user, for example, that user's family members in the same home may be allowed to view stored content on the registered user's storage 120 even if they lack the registered user's login credentials. In granting legitimate users flexible access to stored content, however, it is important to preserve the integrity and security of the stored content to prevent unauthorized use or distribution.

To that end, the host device 110 validates its connected storage device 120 as appropriate to ensure that content stored on the storage device 120 is authorized for streaming, playback and/or other uses. Validation makes use of two separate digital codes that are each stored on the storage device 120 for use in subsequent verification. The codes may be created and stored on the drive when the drive is initialized, for example, for verification at later dates and times. By subsequently checking the digital codes stored on the device 120, the device 120 is authorized for use. Verification may take place when the host device 110 is initialized or started up, for example, as well as whenever a different storage device 120 is coupled to the host device 110. Verification may also take place at regular or irregular time intervals during subsequent operation, if desired.

In various embodiments, host device 110 considers both a device identifier (ID) and a user ID when granting or denying access to content that is stored on the device 120. To allow such functionality, the media device 110 authorizes the drive 120 if it is previously recognized to that device 110, OR if it can be positively associated with an approved user of device 100. Device 110 appropriately considers two separate digital identifiers that are stored on the storage device 120: a device ID 152 and a user identifier (ID) 154. If either device ID 152 or user ID 154 is found to be valid, then content on the device 120 is approved for subsequent use. That is, content on the device 110 can be accessed if either the device id 152 matches an approved code that was previously stored on the drive (thereby indicating that drive 120 is inserted into a known and previously-approved device 110), OR if the user account has been validated and found to match a previously-authorized user account. This allows authorized users to access the drive 120 on other devices 110; conversely, it allows other users to access the drive 120 only on approved devices 110. If the storage device 120 is authorized by the device 110, then the storage device 120 is appropriately paired to device 110 for subsequent use, such as DVR functions, storage of metadata associated with the approved user, and/or other features as desired.

Generally speaking, a paired storage 120 is usually available only to its host host device 110 at a time, unless the same user is authorized for simultaneous use of additional encoder device(s) 110. In that case, content on the paired storage 120 can be shared with other approved devices 110. If the storage 120 is not authorized, however, then the device 110 will not typically use storage device 120 for DVR or other functions even if the device 120 is physically coupled to the device 110. That is, if an unpaired storage 120 is inserted into another user's host device 110 (or an unaffiliated host device 110 that is not yet associated with a particular user), then the other host device 110 will typically not pair with the unrecognized drive 120, and will not use content stored on the drive 120 to prevent unauthorized copying, distribution or other use of the stored content. In such cases, host device 110 will typically notify the user (via client device 130 or otherwise) that the pairing was unsuccessful. Various embodiments may provide further reasons for the unsuccessful pairing (e.g., device not recognized, device paired to a different user, etc.) and/or provide instructions for resolving the issue, if desired. The user may alternately or additionally prompted to reformat the storage device 120 or otherwise re-pair the device 120 as a new storage, if desired.

Device ID 152 and user account ID 154 can be formulated in any manner. In various embodiments, device ID 152 and/or user account ID 154 are digital identifiers of any length that are generated as a product of a hash or other algorithm based upon suitable input data. Device ID 152, for example, may be based upon a unique identifier associated with the host device 110, a different unique identifier associated with the storage device 120, and other data such as the number of storage partitions. Various other embodiments may further consider an array or other data structure that describes the particular configuration of the storage device 120. The data structure could include, for example, a unique digital identifier for each partition found within the file system of storage device 120, along with the size (e.g., in bytes, kbytes, mbytes, etc.) of each partition. Other embodiments may use additional and/or alternate information to generate the device ID 152, as desired. In various embodiments, encoder 110 retains the unique identifier of the storage device 120 (and/or any other information about storage 120) in memory 112 or the like so that the device 120 can be recognized if it is later disconnected and reconnected to the same host device 110.

Similarly, the user identifier 154 may be computed based upon any suitable input data including, without limitation, an ASCII or other representation of the user's account name, the user's unique account identifier, one or more client application codes that identify applications used by the client (e.g., whether the user has subscribed to DVR or streaming services), and/or the like. Such information may be manually provided by the user, and/or client information may be obtained from an account database maintained by network services 140, as desired. In an example embodiment, device 110 suitably obtains user account information from the network service 140 following successful authentication of the user, which typically involves successful presentation of appropriate credentials (e.g., user id/password pair, biometric information, smart identifier data, and/or the like) by the user. Other embodiments may use other information to generate the client ID 154, as desired.

The particular algorithm used to compute the device ID 152 and user ID 154 could proceed in any appropriate manner. In an example embodiment, the various input values described above are simply concatenated in a pre-determined order to create a digital sequence of a fixed length. Padding bits may be added to the digital sequence if needed for the specific algorithm used. This digital sequence is then processed according to a hash or other processing routine to generate a digest, nonce, checksum or other shortened representation of the input data. Typically, the processing routine will be a one-way routine that provides a relatively unique output based upon the input data, but that obfuscates the data so that the original input is very difficult to reverse engineer based solely upon the output value. Examples of suitable functions for generating identifiers could include, without limitation, any number of hash functions used in digital cryptography or the like, such as the SHA-1 algorithm that is typically used in digital cryptography. SHA-1 provides a repeatable 160-bit (20 byte) representation of an input message based upon published mathematical formulas. Equivalent embodiments could use other hash or other obfuscation routines (e.g., MD4, MD5, MD6, SHA-0, SHA- 2, SHA-3, etc.), including any proprietary routines or any routines that are subsequently developed.

As noted above, the host device 110 appropriately creates device ID 152 and user ID 154 for storage on the newly-recognized storage device 120. Typically, the device ID 152 and user ID 154 for a storage device 120 are initially computed by the host device 110 when a new device 120 is first coupled to a host device 110. If the newly-coupled storage device 120 is not formatted, host device 110 may format the new storage device 120 to be compatible with any suitable file system (e.g., XFS, FAT, ext, APFS, any UNIX/ LINUX file system, etc.), as desired. If the device 120 is already formatted with a file system recognized by the encoder device 120, re-formatting may not be necessary, but may nevertheless be desirable for optimal use of storage capacity, elimination of relic data from prior uses, and the like. The device 120 may be formatted with any desired number of partitions, if desired, although many embodiments may prefer a single partition for simplicity.

After generating the device ID 152 and user ID 154 based upon the device and user parameters that are available, the newly-created IDs 152 and 154 may be further encrypted prior to storage using a symmetric key (e.g., AES 128 or the like) that is known to each of the encoder devices 110 that may wish to use the data stored on storage device 120. The symmetric key may be delivered and/or updated to the host device 110 via a firmware or software update, if desired, or through secure communications with network service 140 or the like. The symmetric key may be unique to one or more users, if desired, so that the key is delivered from service 140 with other user information associated with the user. Alternatively, the symmetric key may be shared between multiple users. Some embodiments may use a global key that is burned into hardware or firmware for each device 110, and/or that is updated via secure communications with a trusted service 140. Still other embodiments may use private/public key pairs to encrypt the device ID 152 and user ID 154 prior to initial storage on device 120, or encryption could be eliminated, if desired.

Whether encrypted or not, device ID 152 and user ID 154 represent pairing information that can be stored as a file or other module at an appropriate location on the formatted storage device 120. Pairing information may include other information such as information about the user, storage device 120 and/or content stored on the device 120, as appropriate. The particular location that the pairing information is stored may vary by embodiment, but some implementations may store the pairing information in the root directory of the primary partition for convenient location and access, if desired.

When the host device 110 subsequently recognizes a new storage device 120, the host device 110 will perform a series of operations to validate the connected storage device 120 and to determine whether the storage 120 is paired directly or through a common user account. Validation may also occur whenever the encoder device 120 is rebooted, when a new user logs in to the encoder device 120, or upon any regular or irregular temporal basis to ensure that the drive remains authorized for continued use.

Figure 2:
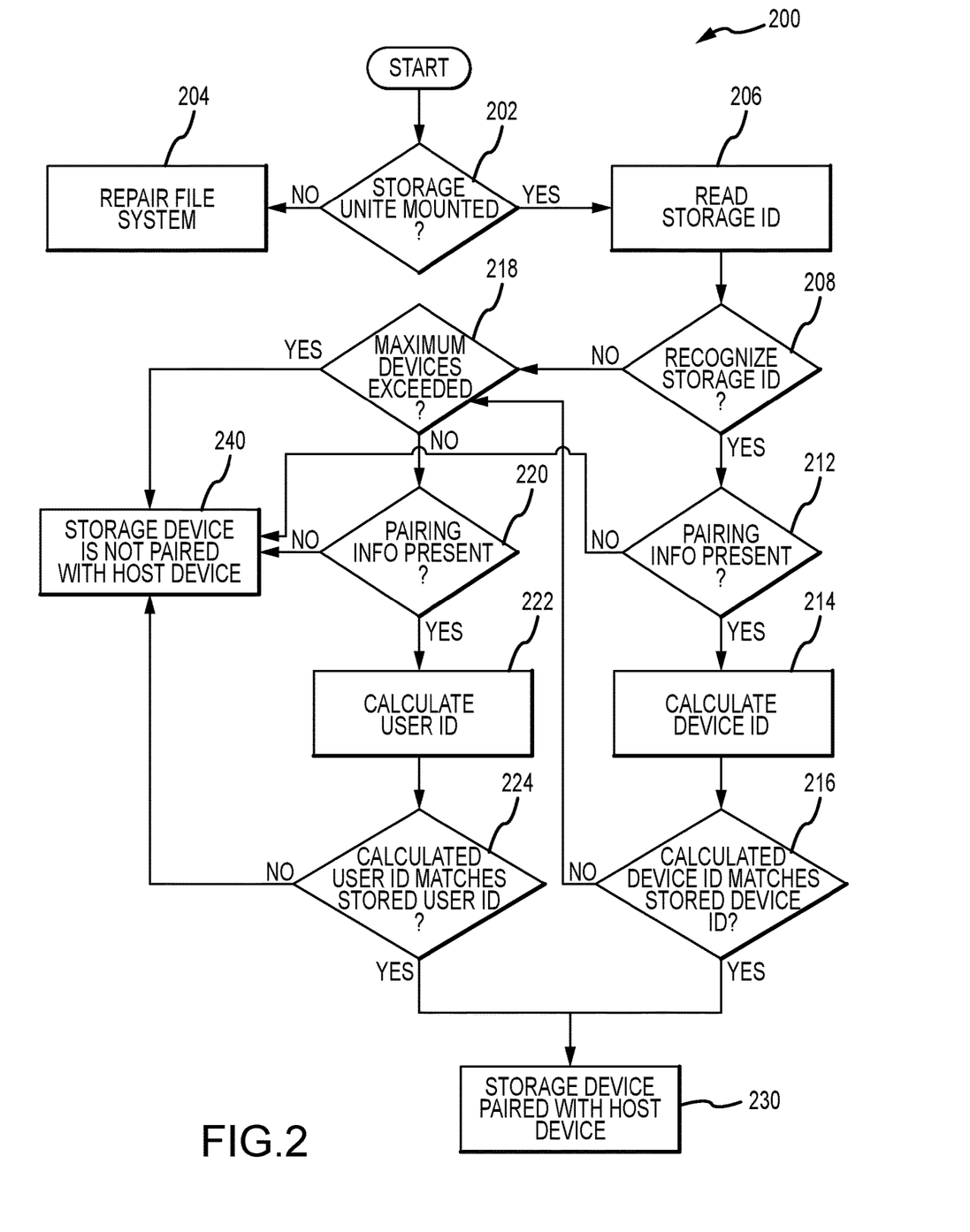
FIG. 2 illustrates various automated processes by which an encoder device and a streaming device interact for delivery of streaming media programming.

An example process 200 to validate the user-supplied storage device 120 is shown in FIG. 2. In some embodiments, the various functions and routines in process 200 are implemented using programmed logic that is stored in memory 112 for execution by processor 111 of encoder 110. Such instructions may be part of a software or firmware image that instructs the hardware of device 110 to perform the various functions described herein. The various functions described in FIG. 2 may be equivalently performed by a programmable logic array or other hardware logic that physically resides within device 110, as desired.

As shown in FIG. 2, process 200 suitably includes initially recognizing that a new storage device 120 has been coupled to the host device 110 (function 202), determining whether the device 120 has been previously connected to the host device 110 (functions 206-208), and determining whether device ID 252 and/or user ID 254 stored on the device 110 match with identifiers that are newly-calculated by the host device 110 based upon then-current data (functions 214-216 and 220-222). If a match is found (functions 216 or 224), then the host device 110 pairs with the newly-presented device 110 (function 230) for subsequent actions. Otherwise, host device 110 does not pair with the storage device 120 (function 240), and content on the device 120 is not accessed as appropriate.

When a memory stick, hard drive or other storage device 120 is physically and electrically connected to an encoder or similar host device 110, the host 110 appropriately verifies that the storage device 120 was correctly mounted, and is able to communicate effectively (function 202). If data communications with the device are unable to proceed, the device 110 will take remedial action 204 to notify the user, to prompt the user to repair storage device 120 (e.g., by issuing an FSCK, chkdsk or similar command), to prompt the user to reformat device 120, or to take any other action as desired.

If host device 110 is able to effectively communicate with the newly-received storage device 120, then the host device 110 reads the unique storage identifier that is associated with the device 120. This identifier is typically hardcoded into the device 120 by the manufacturer, so it is very unlikely to change over time. As noted above, host device 110 typically stores the unique device identifiers in memory 112 so that previously-encountered devices 120 can be recognized. If the device 120 is not recognized, then the device 120 can be assumed to be a newly-encountered drive. If the device 120 is in need of formatting or otherwise indicates that it is a new drive that has never been used in system 100 previously, then encoder 110 may set up the storage device 120 with new device ID 152 and user ID 154 values, as described above.

If the storage device 120 is not recognized by the host device 110 but has been set up by a different device 110 to be compatible with system 100, then processing may continue with function 218, as described below. As noted above, storage devices 120 that are associated with different host devices 110 may nevertheless be approved if the user ID 154 stored on the device is acceptable.

If host device 110 recognizes storage device 120 based upon the unique identifier of device 120, however, then the encoder 110 reads the previously-stored pairing information from the storage device 120 (function 212). The pairing information is decrypted, as needed, for comparison to newly-computed values. If the pairing information is not present on storage 120 or if the information is corrupt, then the storage device 120 is not paired with host, as appropriate (function 240).

The host device 110 suitably re-creates the device ID 152 using its then-current information (function 214). That is, encoder 110 assembles the information used to compute the device ID 152 in the same format and processes the assembled information according to the same hash or other routine. As noted above, the particular computations used for the device ID 152 and subsequent verification will vary from embodiment to embodiment. In one example, the device ID is a function of the encoder's unique device identifier, the storage device's unique device identifier, the number of storage partitions, and an array made up of each partition's unique identifier and size. This information maybe concatenated or otherwise assembled as desired, padded for size if needed, and processed according to the SHA-1 or other obfuscation algorithm. If the results computed based upon the latest information available to the host device 110 match those of the previously-stored device ID 152, then device 120 can be reliably assumed to be the same device that was previously approved (function 216). The device 120 can then be paired with the host 110 for subsequent operation (function 230).

If the calculated device ID does not match the previously-stored device ID 152, then various embodiments may take different actions as desired. In the example process 200 of FIG. 2, failure to match a device ID 152 of a storage device 120 that is nevertheless recognized based upon its unique identifier would generally imply that the device 120 had been removed and re-associated with a different host device 110 that generated the new device ID 152. Alternately, the device 120 may have been re-partitioned or reformatted, or some other changes may have occurred due to interactions with other host devices. In these cases, some implementations may simply deny access to the storage device 120 (function 240), if desired. Other implementations may nevertheless check the user ID 154 to determine if the drive 120 is associated with an approved user, and is therefore approved for subsequent use.

Function 218 represents a determination as to whether the user has too many storage devices 120 associated with his or her account, as appropriate. In various embodiments, function 218 is omitted if users are permitted to maintain an unlimited number of different storage devices 120. Generally speaking, the number of devices 120 that are associated with a user and/or the maximum number of permitted devices 120 is configurable by a system administrator, and will be provided to device 110 from network service 140. The information may also be maintained on device 110, if desired, for offline approval even if network 105 and/or service 140 become unavailable for any reason. If the number of approved devices 120 for any user is met or exceeded, then subsequent attempts to pair additional devices 120 will be denied (function 240).

Encoder 110 obtains pairing information as noted above (function 220). Although shown as a separate function in FIG. 2, practical embodiments may logically combine functions 220 and 212 for compactness and efficiency. Pairing information may be read from device 120 before the storage identifier is processed (function 208), for example, or before the maximum connections are determined (function 218).

As noted above, the pairing information is read from storage device 120 and decrypted, as appropriate. The host device 110 then attempts to match the previously-computed user ID 154 based upon currently-available information (function 222). In one example, the current user's account name, unique account identifier, application codes and/or other data are concatenated or otherwise assembled for processing by a SHA-1 or similar routine. Other embodiments could use other inputs and/or other processing routines, as desired.

If the newly-calculated user identifier matches the user ID 154 that was previously stored on device 120, then the device 120 may be approved for subsequent use (function 230). Conversely, if the newly-computed information does not match user ID 154, then access to the storage device 120 is denied (function 240). Further embodiments may perform additional or alternate processing, as desired.

If the device ID 152 and user ID 154 are structured as described herein, then any changes to the user's account or the device 120 will result in denial of further access. The denials may be processed in any manner (function 140), although various embodiments will notify the user (e.g., via an interface presented by media player device 150) of the denial, and any information that may aid in remedying the denial. Some embodiments will alternately or additionally maintain a log of any approvals or denials for subsequent analysis by a troubleshooter or technician. Still further embodiments may provide a message to network service 140 to indicate success or failure in authentication to aid in troubleshooting and/or to detect unauthorized behavior.

FIG. 2 therefore illustrates one example process 200 performed by the processor 111 of an encoder or other media device 110 to determine if a newly-mounted storage device 120 should be approved for subsequent use or denied. Note that access to the storage 120 is granted if the computation based upon the current device 110 matches the device ID 152 previously stored on the drive 120, or if the computation based upon the current user account info matches the user ID 154 previously stored on the drive 120. If neither ID 152 or 154 matches with current computations, then access to data stored on the drive 120 is denied. Other actions may be taken as described above.

By maintaining separate identifiers 152 and 154 based upon the host device 110 and the user's account, respectively, the user-provided storage device 120 can be flexibly deployed for numerous purposes without jeopardizing the integrity of content stored on the device 120. This feature may be used in isolation, if desired, and/or augmented with other security features described herein. Further, the concepts of verifying a user-supplied storage device 120 based upon dual identifiers 152, 154 is not limited to place or time shifting, and may be implemented in any number of other scenarios and environments, including television set top boxes, video game players, media players of any sort, or the like.

Storage Drive Content Protection Using Filesystem Level Encryption

Secure pairing of user-supplied storage device 120 can prevent unauthorized access to stored content by a host device 110. Unscrupulous users, however, could still attempt to gain access to the stored content by initially pairing an approved drive 120 to a host device 110, storing content on the drive 120, and then removing the drive 120. The user would typically connect the removed drive 120 to a computer or other host that is not configured to perform the pairing process described above, but that could otherwise access content stored on the drive 120. If the content were simply stored in a well-known format, another host device could simply copy the content for re-distribution, sharing or other unauthorized use. It is therefore generally desirable to encrypt or otherwise protect the content that is stored on a paired storage device 120.

This desire to obscure the stored content can be constrained by the processing capabilities of the host device 120. That is, encrypting stored content can present a challenge to many processors 111, particularly when the processor 111 is expected to simultaneously decode received content, encode the received content for place shifting and/or store received content for storage on a DVR or the like. The computational demands of encrypting an entire media program may challenge the capabilities of many processors 111 commonly found in host devices 110.

In various embodiments, one or more storage partitions of the storage drive can be configured so that only certain portions of the media content are encrypted, while the remainder of the data remains unencrypted. In many file systems, for example, certain blocks of data (e.g., "superblocks" in file system headers) describe the contents of the files containing the remaining data. If this header information is encrypted or otherwise obscured, the remaining data is essentially rendered useless even though it is not necessarily encrypted. By carefully selecting only certain portions of the data to encrypt, then, the unencrypted data remains amorphous and generally unusable, thereby preserving the integrity of the data without the computational demands of full encryption. Note that references to encrypting "only" the superblocks or headers are intended to convey that the header information is encrypted to obscure or amorphousize the unencrypted data. It is possible that some equivalent embodiments will encrypt at least a small portion of the program data (e.g., encoded frames of moving video, particularly I-frames or other high value frames) for added security without departing from the concept of encrypting "only" the superblocks or other metadata on the storage device 120. Encryption may be performed using any algorithm or other technique. In various embodiments, AES symmetric encryption using key lengths of 64 or 128 bits can be used to securely protect the header information. Other embodiments may use other symmetric and/or asymmetric encryption techniques, as desired. Key lengths may similarly vary, depending upon the level of security desired and the computing capabilities that are available. Keys may be shared using any appropriate techniques, as described more fully below.

The concepts described herein may be implemented using any file system, including XFS, FAT (e.g., FAT32), NTFS, NFS, HFS+, UFS and/or any other file system desired. In one embodiment, the mkfs.xfs and xfs_repair tools can be used to limit access to data stored on a drive 120 that is formatted in accordance with the XFS file system. Other embodiments could use any number of other tools in conjunction with any underlying file system.

Encrypting the header information ensures that the storage device 120 is not mountable across other machine or media devices 110 unless the storage unit is paired with it, as described above. That is, if a user attempts to view the contents of storage device 120 from an unpaired device 110 or from another computer or the like, the header data will be unreadable, and therefore the contents of the drive 120 will be very difficult to discern. This is especially true if the protected content is video data, which will appear highly random if the structure of data is obscured.

To that end, then, various embodiments encrypt the file system headers without necessarily encrypting the remaining portions of the data files. In an XFS file system, for example, the XFS headers that describe the various data files stored on the drive or partition can be encrypted to prevent access to the information that would be needed to understand the remainder of the data. XFS uses a superblock structure in which "superblocks" describing the other files occupy the first portion (e.g., 512 bytes or so) of each allocation group (AG) in the partition. This superblock typically includes "absolute" addresses of files residing within the allocation group, with each absolute address containing a relative offset (e.g., byte or block count) from the beginning of the AG. Addressing information may also include information about the AG itself, such as the number of AGs, the size of the AG, the root inode number, counts of existing and/or free inodes, and/or other information as desired. The information contained in the superblock allows the host device 110 to locate and format the data stored on device 120, so if the superblock information is obscured by encryption or the like, the remainder of the data on storage device 120 will not typically be useable.

Figure 3:
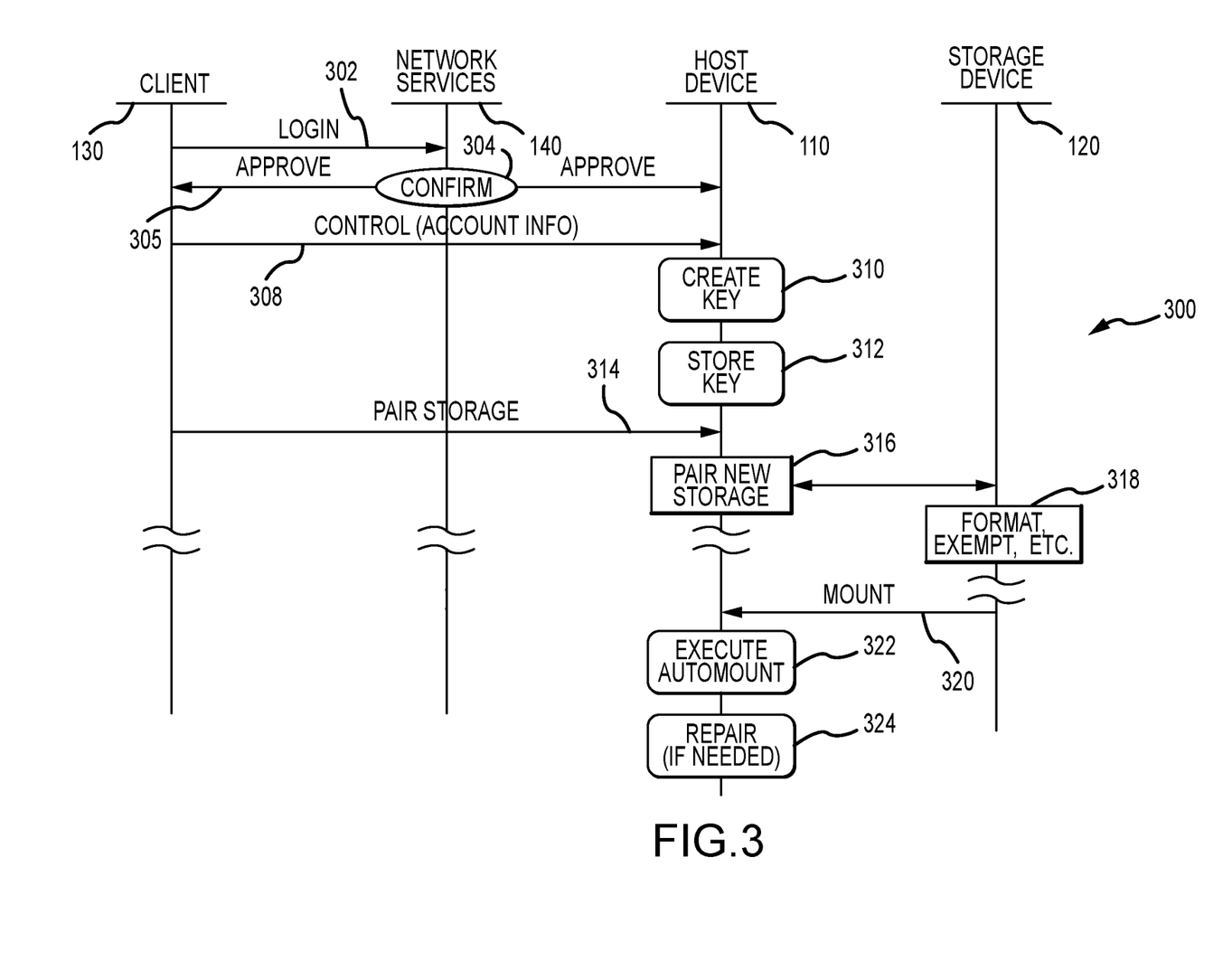
FIG. 3 illustrates various automated processes to protect content on a user-supplied storage device using file system encryption.

FIG. 3 shows an example process 300 to pair and encrypt the header information of a storage device 120. As shown in FIG. 3, the user typically operates a client device (e.g., a phone, tablet, smart appliance, computer, etc.) 130 to authenticate with a network service 140 via network 105 (function 302). The network service 140 appropriately checks the login credentials supplied by the client device 140 to confirm the user (function 304), and approval messages 305 and 306 are sent to the client device 140 and any host devices 110 that are associated with the approved client, as appropriate. The approval messages may contain, for example, an account name, a unique account identifier, application permissions information, and/or other information about the user as desired.

The approved client device 130 subsequently establishes a control connection 308 with the host device 110 via network 105 or the like to obtain streaming content from storage device 120, to obtain media streams encoded from broadcast content received by host device 110, and/or for any other purposes. Client device 130 will typically send a configuration instruction to the host device 110 that includes the user's unique account identification, account name and/or other identifying information.

This identifying information about the approved user can be used to create a unique key for use by that user (function 310). In various embodiments, the received digital identifying information is supplied to a hash or similar one-way function as described above for obfuscation purposes. Some implementations will further combine the hashed result with a global key or similar feature for added security. In one example, the key is constructed from the first sixteen bytes or so of a hash result obtained from a concatenation of the supplied user information with a global key, as desired. Other implementations may use keys based upon digital signatures, nonces or other shared secrets. Global keys may be further constructed based upon initialization vectors (IV) that are securely supplied to the host device 110 (e.g., via software or firmware updates), as desired.

Key information including constructed keys, initialization vectors, and/or the like are typically stored by the host device 110 in memory 112 or the like, as appropriate (function 312). Device 110 may have NAND flash memory, for example, that is capable of securely storing the constructed keys for subsequent use. Keys and/or initialization vectors may themselves be encrypted with an additional key known to host device 110 if additional security is wanted. Device 110 may store the key information along with user data or the like in a /config folder, or elsewhere as desired.

Pairing of a new storage device 120 can take place in any manner (function 316). In the example of FIG. 3, the client device 130 transmits an instruction 314 to the host device 110 to perform the initial pairing. Other embodiments may automatically detect the presence of a new device 120, and interact with the user in any appropriate manner (e.g., user interface of client 130, lights or indicators on device 110, and/or the like) to determine that the new storage 120 is ready for setup.

The new storage device 120 is paired in any appropriate manner (function 316). In one example using the XFS file system, the mkfs.xfs tool can be used to format new partitions on the drive 120. In this case, mkfs.xfs could use the encryption key and initialization vector stored in the /config folder to encrypt the superblocks of the newly-formatted file system using AES128 or the like. In other embodiments, a mkfs.xfs command could be issued to initially create the superblocks in the clear, and a subsequent encryption could be performed with a separate tool so that the clear superblocks are encrypted prior to actual use. Still further, superblocks could be initially left in the clear and encrypted by host device 110 at the next mount or unmount partition instance, if desired. Still further embodiments could perform the encryption according to any routine performed at any time.

The various superblocks or other regions of storage device 120 that contain header data are suitably encrypted, as described herein (function 318). In some implementations, the operating system kernel and/or file system of host device 110 is provided with the encryption key and initialization vector values via /proc files or the like to thereby permit encryption and decryption of header data whenever the storage partition is mounted to the device 110.

After the encryption is performed, the storage device 120 can only be mounted with host devices 110 that are linked to the same user account, since the encryption key is a function of the user's unique account information. Further embodiments could additionally create device ID 152 and user ID 154 for storage on device 120, as described above, for further security. Device and user IDs could be created by executing process 200 or the like as part of function 316, for example, and/or at any other time. Device and user IDs 152 and 154 may be further encrypted using the techniques set forth herein, if desired, prior to storage on device 120. Still other embodiments could support multiple user accounts by maintaining redundant sets of encrypted header data (e.g., each set encrypted with a different key), or in any other manner.

Host device 110 is therefore able to remount one or more partitions of storage device 110 using the encrypted header information (function 322). In an example embodiment, the host device 110 suitably executes an "automount" or similar command when the storage device 120 is connected via a USB or other interface. In this example, the automount command could execute a script that copies the encryption key and IV data from the /config folder (stored in NAND flash or the like) to the /proc folder of the file system for use by the OS kernel and/or file system. If the storage device 110 has more than one partition, a check may be performed to determine whether each partition's file system contains encrypted header data (e.g., superblocks) or not. If the header information is not encrypted, then the host device 110 is free to use the unencrypted data. If the header data is encrypted, however, then the host device 110 suitably loads the previously-stored encryption key and initialization vector, decrypts the superblocks or other header data, and mounts the partition for subsequent use. When the partition is unmounted and/or data is to be synced with the storage drive, then any modified superblocks (or other data) can be re-encrypted using the previously-created key and written to the partition, as appropriate.

If a partition becomes corrupt or otherwise fails to mount properly, it may be desirable to invoke a repair process or the like (function 324). Repair may not be provided in all embodiments, but it can be useful, particularly for user devices deployed in home environments where troubleshooting and technical support can be challenging. To that end, various embodiments could invoke an xfs_repair tool or the like that uses the same key and IV values form the /config fold to repair or recreate the header information, to re-encrypt the repaired information, and then re-store the encrypted superblocks to the storage partition. In other embodiments, an xfs_repair or similar tool could write any modified superblocks in the clear, and the file system could then re-encrypt the superblocks at the next mounting or unmounting of the partition. Still other embodiments could perform troubleshooting or repair using any number of different tools that are executed at any appropriate times, as desired.

FIG. 3 therefore shows an example process 300 to encrypt the header information of a user-supplied storage device 120 using a key that is derived from the user's unique identification. The identification could correspond to the user, a user account and/or the like so that the header data on the drive can only be decrypted with that same user's unique information. Further, by encrypting only limited portions of the data on the drive 120, the computational overhead on processor 111 can be dramatically reduced. If only header information (e.g., the contents of XFS superblocks) is encrypted, for example, the remainder of the unencrypted data is essentially rendered to be useless, thereby preserving the integrity of the media contents stored on device 120.

As noted above, the general concept of encrypting limited portions of the storage device 120 could be used in isolation with any number of different devices, and/or the concept may be deployed along with dual IDs 152, 154 as set forth above, and/or in conjunction with the efficient streaming set forth below.

Light Weight Transport Stream (Ts) Streaming Protocol for Live Transcoding System As noted above, various embodiments of host device 110 may perform placeshifting or similar live streaming of received television broadcasts or other media programs. As also recognized above, it can be a significant challenge for processor 111 of host device 110 to simultaneously perform multiple demanding functions such as television signal demodulation, transcoding of the received stream for placeshifted viewing, storing demodulated content in a DVR or the like (potentially including encryption), responding to control instructions from user device 140 and/or other functions. One solution to the demands can involve limiting the encryption of stored content to the superblocks or other descriptions of file headers, as set forth above. Some embodiments that perform transcoding, placeshifting and/or other forms of live streaming may alternately and/or additionally reduce processor demands by adapting the streaming protocol used to deliver live content. This reduced overhead protocol may have additional benefits if the reduced encoding time reduces perceived latency in changing channels, trick play, or other user instructions.

With conventional adaptive streaming protocols such as HTTP Live Streaming (HLS), DASH or the like, MPEG or similar transport stream (TS) packets are typically grouped into segments that collectively represent about 1-10 seconds or so of playback content. The underlying MPEG data of the source video is therefore assembled and re-encoded as needed to create individually-playable segments of relatively fixed length. Each segment generally has a unique universal resource locator (URL) or other address that is identified in a manifest file that is delivered to the client 130. Client 130 appropriately obtains needed segments of the video stream by placing an HTTP or similar request to the URLs/addresses contained in the manifest file to obtain the needed segments for playback of the video stream.

Creating video segments can often involve significant processing overhead. Since segment boundaries generally occur based upon fixed playback times, it is often necessary to encode new I-frames or the like at relatively arbitrary times (e.g., at the beginning of each segment) without regard to the underlying content, which can result to significant computational demands. In addition to the demands of creating segment boundaries, processor 111 typically needs to perform multiple buffer copy operations while creating segments and while changing the container format of the data from MPEG TS to fmp4 (e.g., DASH protocol) or the like. Some implementations also use HLS proxy or the like to improve throughput; this can occur because HLS does not typically support multiple concurrent segment requests, so proxies are used to pipeline multiple segment requests over multiple sockets, thereby resulting in substantial processing demands.

Many of these computational demands can be eliminated, or at least greatly reduced, by simply transmitting the media stream in MPEG TS format. To accomplish this, various data messages are formulated with MPEG TS data as a payload encapsulated within TCP, UDP or similar messaging frames.

Since the MPEG-TS data is relatively unstructured in comparison to very carefully created HLS, DASH or similar segments, it is generally desirable for the host device 110 to transmit additional packets with metadata or other descriptive information that allows the recipient device 130 to format and otherwise process the received data. Additionally, it is generally desirable to encrypt or otherwise conceal at least some of the TS stream content to prevent unauthorized copying or other use of the content. In delivering the TS stream content, then, it is generally desirable to provide header or other "null" packets within the stream to describe the format of the remaining data, particularly if the data is encrypted.

Figure 4:
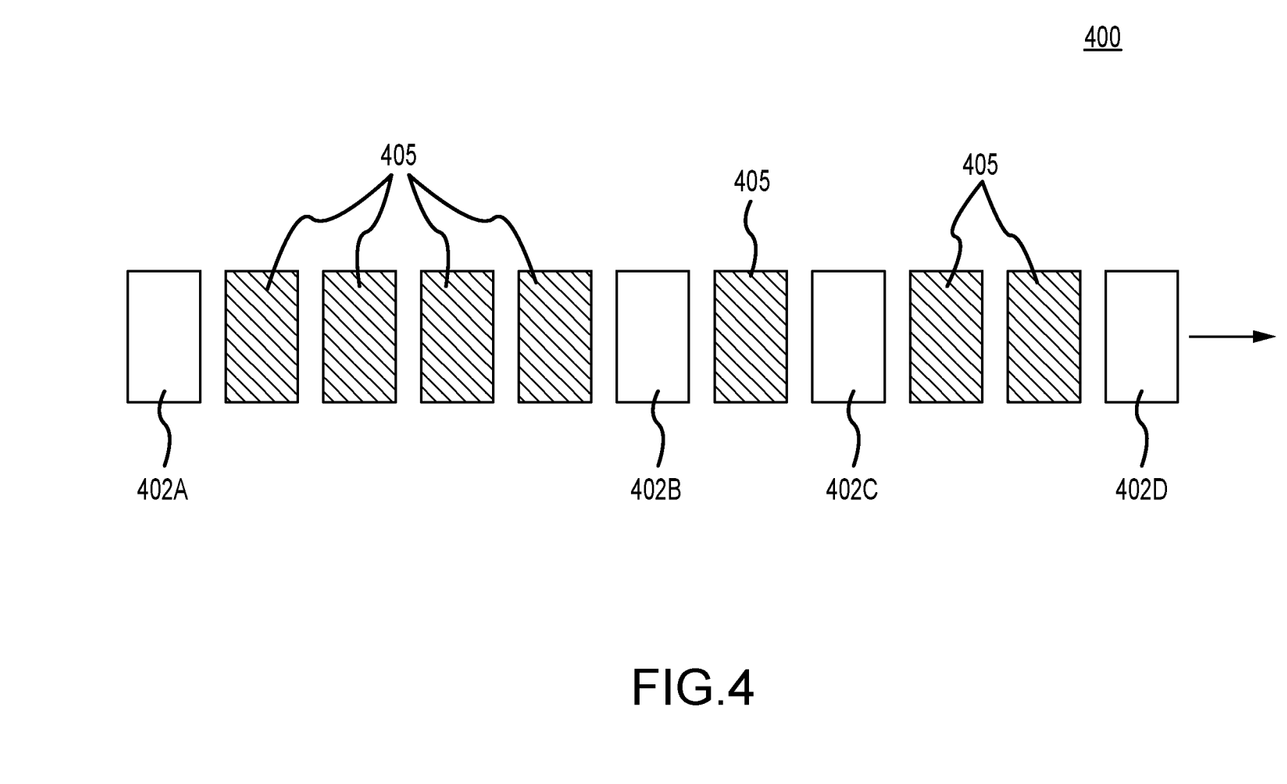
FIG. 4 shows an illustration of an example scheme for securely delivering transport stream packets from a server device to a client device.

FIG. 4 shows an example of a media stream 400 having metadata packets 402 interleaved within the stream amongst encrypted data packets 405. The particular order and structure of the metadata packets 402 with respect to the various data packets 405 is simply an example to show the interleaved nature of the stream 400; practical embodiments may intersperse any number of metadata packets 402 at any regular or irregular intervals between data packets 405, as desired.

Generally speaking, it is desirable to provide adequate security for the underlying data without incurring excessive processing overhead. To that end, several different encryption options could be considered, each with their respective pros and cons. In a first example, the data packets 405 in the transport stream could be encrypted while the metadata packets 402 remain unencrypted. The encryption could use, for example, the AES cipher block chaining (CBC) 128 routine, which provides relatively strong protection in comparison to, for example, AES electronic codebook (ECB) 128 or the like. In this example, the client device 130 suitably checks the received packet stream 400 for one or more metadata packets 402. The identified metadata packets 402 are extracted before being provided to the media player of the device 130, and evaluated to view the various control parameters of the stream (e.g., encryption parameters, data formatting and/or any indicators of channel change, trick play and/or other reason to flush the previously received content). One advantage of using cipher block chaining is that the encryption is stronger and generally faster than ECB encryption. The routine relies, however, upon knowledge of cryptography performed earlier in stream 400. That is, subsequent ciphertext is derived from the plaintext that was processed earlier in the stream. This is a more advanced form of encryption than ECB that produces effective results, but at the expense of increased dependency upon the entire stream. With the CBC technique, it is generally desirable to exclude the metadata packets 402 from encryption in order to allow faster processing of those packets, particularly in the event of a channel change or other buffer flush. That is, if the channel is changed, it is generally desirable for the player 130 to react as quickly as possible to reduce latency and improve the user experience. If the player 130 had to wait for complicated decryption before recognizing the buffer flush, then processing is undesirably delayed. It may therefore Other embodiments could encrypt the entire stream 400 including the metadata packets 402 using ECB encryption, which, although a more basic form of encryption than CBC, eliminates (or at least substantially reduces) dependency upon prior packets. In this example, the same key is typically used to encrypt and decrypt blocks of fixed size (e.g., sixteen bytes or so in one example), without regard to the content of prior blocks in the stream 400. In this case, each packet in stream 400 is more quickly decrypted and recognized, so that delays in recognizing metadata packets 402 are less of an issue. Metadata packets 402 may simply recognized in the regular course of decrypting stream 400, if desired. Various embodiments could further ensure that the metadata packets 402 (or at least those packets that indicate buffer flushes or other latency-sensitive actions) are aligned on the decryption frame boundaries so that they are immediately recognized upon receipt of the packet 402. Other embodiments may enhance or modify these general procedures in any manner.

In various embodiments, the digital keys used to encrypt and decrypt the relevant portions of stream 400 could correspond to the keys and IV values described above with respect to encrypting header data on storage device 120. Since the key values described therein are based upon the user's account or other unique information, the same key could be used to secure transport stream data provided to the same user. Other embodiments could use separate keys for streaming and DVR storage, if desired. In a hybrid implementation, the streaming key could use the same hash value used to create the DVR key, but with a different universal code appended for streaming. Still other embodiments may use asymmetric public/private keys, if desired, and/or any other keys according to any protocol, format and length desired.

As mentioned above, the various security techniques may be inter-combined in any manner. The secure streaming technique could be used on its own in any sort of place shifting, VOD, LSDVR, RSDVR or other setting. Alternately, secure streaming could be used in conjunction with secure drive pairing and/or encryption of header data, as desired. Again, many alternate but equivalent embodiments could be formulated using the various concepts described herein.

Although the network environment is often described herein as a "home" environment, equivalent concepts could be applied to offices, schools, factories, restaurants and bars, and/or any number of other environments that make use of one or more local area networks. Moreover, the concepts described herein with respect to contacting DVR or PVR video storage devices to establish video streaming could be equivalently applied for other applications or purposes, such as internet television (IPTV), video gaming, home or office control, file or print sharing and/or any other applications as desired. References to specific devices or products (e.g., "AirTV", "AirTV Classic" or "AirTV Classic Box" devices) are simply examples; equivalent concepts could be implemented in any number of other devices or systems, as desired.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. An automated process performed by a host device that transmits a media stream to a remotely-located media player device via a digital network, the host device comprising a processor, a memory, a storage interface configured to physically and electrically couple to a user-provided storage device and a network interface to the digital network, wherein the automated process comprises:
receiving digital media content by the host device;
storing the received digital media content on the user-provided storage device in an MPEG-2 transport stream format, wherein the MPEG-2 transport stream comprises a plurality of packets including control packets and data packets;
receiving, by the host device, a unique identifier that identifies a user of the remotely-located media player device;
creating, by the host device, a digital key based upon the received unique identifier;
subsequently receiving a request for the media stream from the remotely-located media player device; and
in response to the received request, the host device:
encrypting all of the control packets and only a portion of the data packets of the MPEG-2 transport stream, wherein the encrypting comprises encrypting data packets of the media stream but not encrypting header packets of the media stream, and wherein only the data packets of the media stream are encrypted with a cipher block chain (CBC) encryption routine prior to transmission using the digital key created by the host device based upon the unique identifier;
encapsulating all of the packets of the MPEG-2 transport stream in user datagram protocol (UDP) packets; and
transmitting the encapsulated packets of the MPEG-2 transport stream to the remotely-located client device via the digital network for decryption of the data packets using the unique identifier and playback of the MPEG-2 transport stream to the user of the remotely-located client device.

2. The automated process of claim 1 wherein the digital media content is received, stored and transmitted in the transport stream format.

3. The automated process of claim 1 wherein the packets of the media stream are encrypted with an electronic codebook (ECB) encryption routine prior to transmission.

4. The automated process of claim 3 wherein the ECB encryption routine is AES-ECB.

5. A host device comprising:
a memory configured to store computer-executable instructions;
a network interface to communicate via a digital network;
a storage interface to physically and electrically couple with a user-supplied storage device; and
a processor, wherein the processor is configured to execute the computer-executable instructions to perform an automated process that comprises:
receiving digital media content by the host device in an MPEG-2 transport stream;
storing the received digital media content on the user-provided storage device in the MPEG-2 transport stream format, wherein the MPEG-2 transport stream comprises a plurality of packets including control packets and data packets;
receiving, by the host device, a unique identifier that identifies a user of the remotely-located media player device;
creating, by the host device, a digital key based upon the received unique identifier;
subsequently receiving a request for the MPEG-2 media stream from the remotely-located media player device; and
in response to the received request, the host device:
encrypting all of the control packets and only a portion of the data packets of the MPEG-2 media stream, wherein the encrypting comprises encrypting data packets of the media stream but not encrypting header packets of the media stream, and wherein only the data packets of the media stream are encrypted with a cipher block chain (CBC) encryption routine prior to transmission using the digital key created by the host device based upon the unique identifier;
encapsulating all of the packets of the MPEG-2 transport stream in user datagram protocol (UDP) packets; and
transmitting the encapsulated packets of the MPEG-2 transport stream to the remotely-located client device via the digital network for decryption of the data packets using the unique identifier and playback of the MPEG-2 transport stream to the user of the remotely-located client device.

6. The host device of claim 5 wherein the digital media content is received, stored and transmitted in the transport stream format.

7. The host device of claim 5 wherein the packets of the MPEG-2 media stream are encrypted with an electronic codebook (ECB) encryption routine prior to transmission.

8. The host device of claim 7 wherein the ECB encryption routine is AES-ECB.

9. The host device of claim 8 wherein the data packets of the MPEG-2 media stream are encrypted with a cipher block chain (CBC) encryption routine prior to transmission.

10. The host device of claim 5 wherein the host device is a media encoder device that receives broadcast television signals via an antenna, that demodulates the received broadcast television signals, that stores the demodulated broadcast television signals in the MPEG-2 transport stream format on the user-supplied storage device, and that produces the media stream transmitted to the client device from the demodulated broadcast television signals stored in the MPEG-2 transport stream format on the user-supplied storage device.

11. An automated process performed by a media encoder device that receives broadcast television signals via an antenna and that transmits a media stream to a remotely-located media player device via a digital network, the media encoder device comprising a processor, a memory, a storage interface configured to physically and electrically couple to a user-provided storage device and a network interface to the digital network, wherein the automated process comprises:

receiving broadcast television signals via the antenna;

demodulating the received broadcast television signals to extract digital media content, wherein the digital media content is received as a transport stream having an MPEG-2 format comprising a plurality of packets including control packets and data packets;

storing the demodulated digital media content on the user-provided storage device in the MPEG-2 format;

receiving, by the host device, a unique identifier that identifies a user of the remotely-located media player device;

creating, by the host device, a digital key based upon the received unique identifier;

subsequently receiving a request for the media stream from the remotely-located media player device; and     in response to the received request, the host device:

encrypting all of the control packets and only a portion of the data packets of the transport stream in the MPEG-2 format with a cipher block chain (CBC) encryption routine prior to transmission, wherein the CBC encryption routine is AES-CBC, wherein the encrypting comprises encrypting data packets of the media stream but not encrypting header packets of the media stream, and wherein only the data packets of the media stream are encrypted with a cipher block chain (CBC) encryption routine prior to transmission using the digital key created by the host device based upon the unique identifier;

encapsulating all of the packets of the transport stream in user datagram protocol (UDP) packets; and         transmitting the encapsulated packets of the transport stream in the MPEG-2 format to the remotely-located client device via the digital network for decryption of the data packets using the unique identifier and playback of the MPEG-2 transport stream to the user of the remotely-located client device.

\* \* \* \* \*